US007461021B2

(12) United States Patent
Bergmann et al.

(10) Patent No.: US 7,461,021 B2
(45) Date of Patent: Dec. 2, 2008

(54) METHOD OF ASCERTAINING AN EFFICIENT FRONTIER FOR TAX-SENSITIVE INVESTORS

(75) Inventors: Michael D. Bergmann, Bow Mar, CO (US); Daniel Yoo, Aurora, CO (US)

(73) Assignee: AMG National Trust Bank, Englewood, CO (US)

(*) Notice: Subject to any disclaimer, the term of this patent is extended or adjusted under 35 U.S.C. 154(b) by 1228 days.

(21) Appl. No.: 09/995,178

(22) Filed: Nov. 27, 2001

(65) Prior Publication Data

US 2002/0143682 A1    Oct. 3, 2002

Related U.S. Application Data

(60) Provisional application No. 60/253,918, filed on Nov. 29, 2000.

(51) Int. Cl.
*G06Q 40/00* (2006.01)
(52) U.S. Cl. .................. 705/36; 705/400; 705/35
(58) Field of Classification Search ............... 705/36 R, 705/36 T, 400, 35
See application file for complete search history.

(56) References Cited

U.S. PATENT DOCUMENTS

| 5,148,363 | A | 9/1992 | Dambo |
| 5,794,207 | A | 8/1998 | Walker |
| 5,812,988 | A | 9/1998 | Sandretto |
| 5,884,287 | A | 3/1999 | Edesess |
| 5,991,744 | A | 11/1999 | DiCresce |
| 6,003,018 | A | 12/1999 | Michaud |
| 6,021,397 | A | 2/2000 | Jones |
| 6,115,697 | A | 9/2000 | Gottstein |
| 6,161,098 | A | 12/2000 | Wallman |
| 6,240,399 | B1 * | 5/2001 | Frank et al. ............... 705/36 R |
| 6,269,346 | B1 | 7/2001 | Cristofich |
| 6,275,814 | B1 | 8/2001 | Giansante |
| 6,282,520 | B1 | 8/2001 | Schirripa |
| 6,292,787 | B1 | 9/2001 | Scott |
| 2002/0138386 | A1 * | 9/2002 | Maggioncalda et al. ....... 705/36 |
| 2005/0154658 | A1 * | 7/2005 | Bove et al. ..................... 705/35 |

OTHER PUBLICATIONS

Lynn Brenner "Family Finance / Getting a Handle On Rules of Roth IRAs";Newsday. (Combined editions). Long Island, N.Y.: Apr. 29, 2000. p. F.04.*
Jacob, Nancy "Tax-efficient investing: Reduce tax drag, improve asset growth"; Trusts & Estates. Atlanta: Jun. 1996.vol. 135, Iss. 7; p. 25, 8 pgs.*
Reichenstein "Calculating Asset Allocation", Fall 2000.*

* cited by examiner

*Primary Examiner*—Harish T. Dass
(74) *Attorney, Agent, or Firm*—Gregory W. O'Connor

(57) ABSTRACT

There are computerized processes for financial planning for individuals and groups whose financial portfolio would be subject to tax on certain events. But these processes do not take into account these taxes when optimizing investment decisions, since taxes levied on investment outcomes, typically on income and realized capital gains, may have an important impact on net portfolio results. This invention is a method for transforming the usual pretax information for calculation of an efficient frontier, unique to an investor's portfolio, in such a manner that any portfolio on the calculated frontier is efficient after incorporating the effect of taxes on the risk and expected return of each asset class permitted in the investor's portfolio. This invention addresses how this may be done and how certain facets of the process may be incorporated into a computer program or system so as to provide convenience to the potential user.

8 Claims, 3 Drawing Sheets

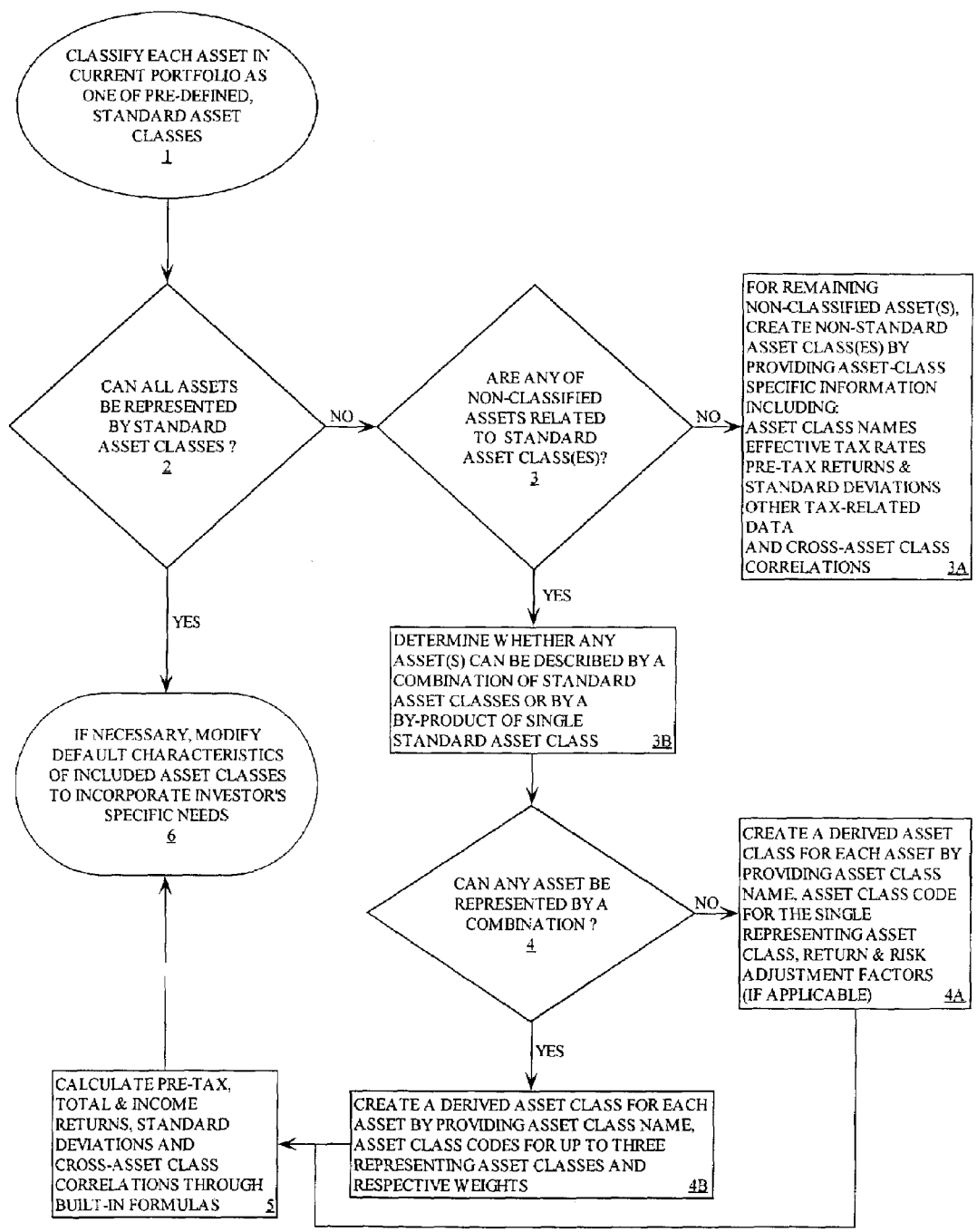
PROCESS OF DEFINING ASSET CLASSES Fig. 1

CALCULATION OF AFTER-TAX, TOTAL RETURN & STANDARD DEVIATION Fig. 2
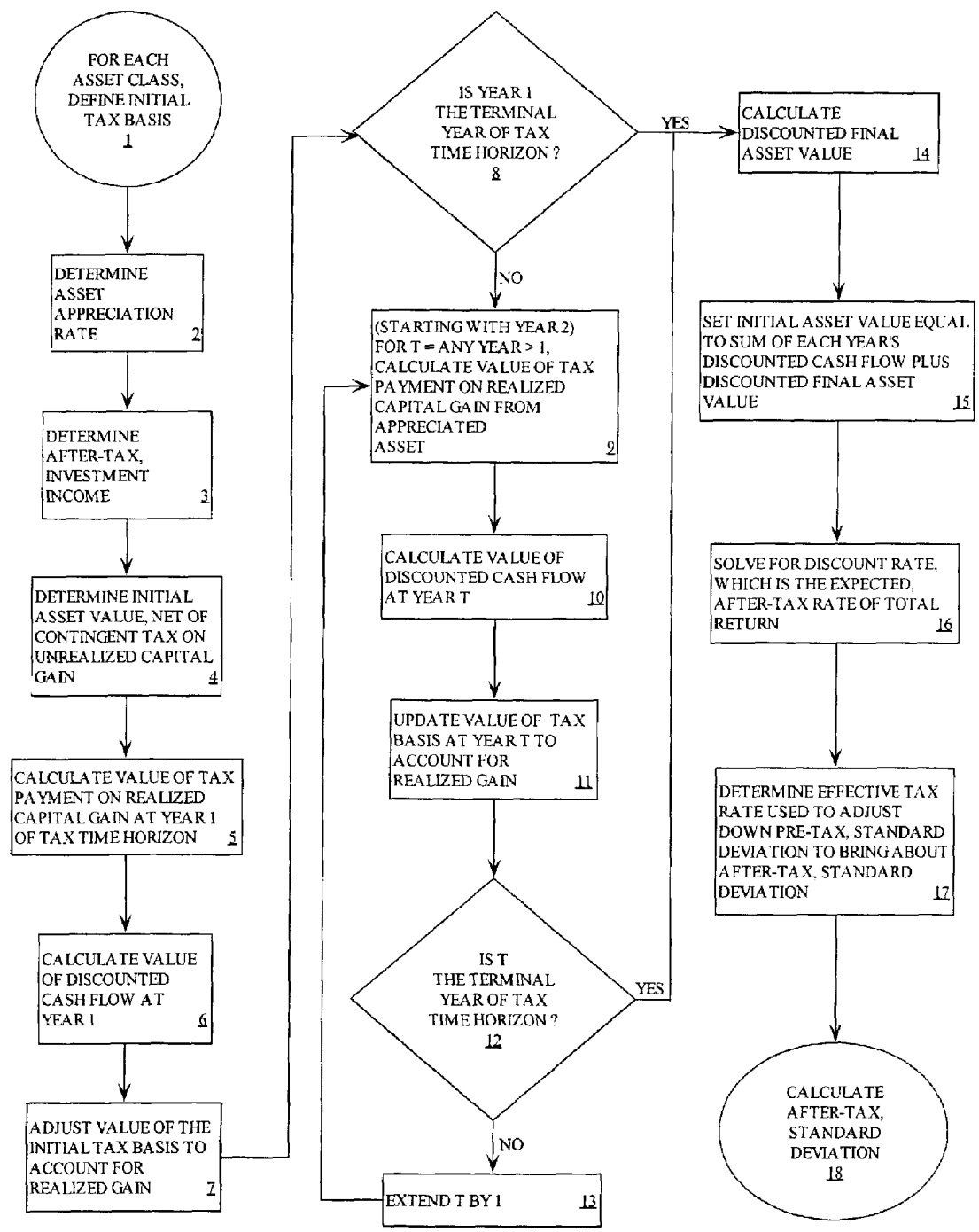

PROCESS OF DEVELOPING AN OPTIMAL, AFTER-TAX ASSET ALLOCATION STRATEGY    FIG. 3
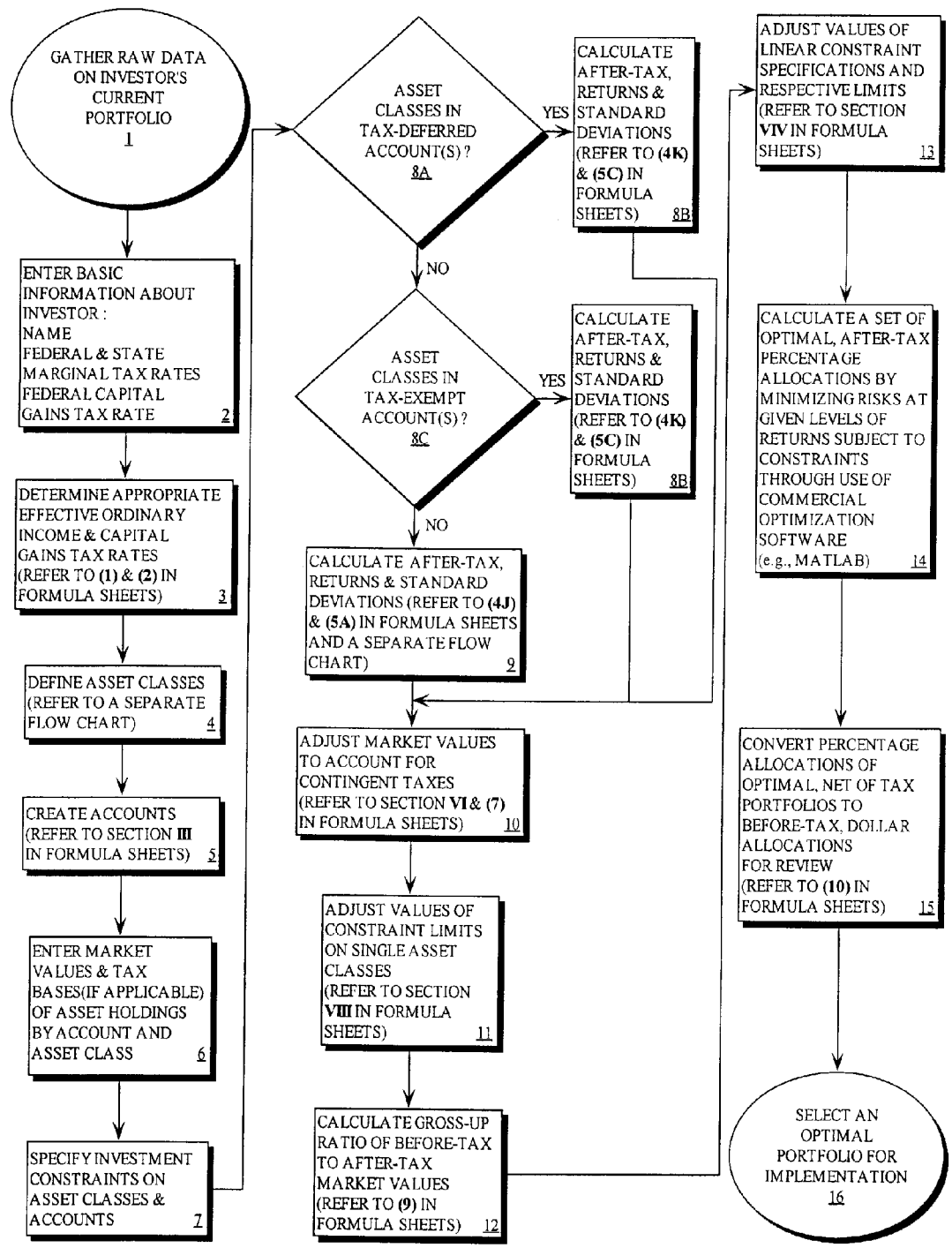

US 7,461,021 B2

METHOD OF ASCERTAINING AN EFFICIENT FRONTIER FOR TAX-SENSITIVE INVESTORS

RELATED APPLICATIONS

This application claims benefit of earlier filed Provisional Application Ser. No. 60/253,918 filed on Nov. 29, 2000.

BACKGROUND OF THE INVENTION

This invention relates to computerized processes for financial planning for individuals and groups whose financial portfolio would be subject to tax on certain events. More, particularly, this invention is a method for transforming the usual pretax information for calculation of an efficient frontier, unique to an investor's portfolio, in such a manner that any portfolio on the calculated frontier is efficient after incorporating the effect of taxes on the risk and expected return of each asset class permitted in the investor's portfolio. In this context an "efficient frontier" is the set of all efficient portfolios. An after-tax efficient portfolio is one that provides the greatest expected after-tax total return for a given level of after-tax risk. In order to structure a portfolio for an individual investor, one must take the effects of taxes into account, since taxes levied on investment outcomes, typically on income and realized capital gains, may have an important impact on net portfolio results.

SUMMARY OF THE INVENTION

This invention addresses how this may be done and how certain facets of the process may be incorporated into a computer program or system so as to provide convenience to the potential user.

The invention achieves its purpose by transformation of pretax input data typically used in the current state-of-the-art optimization processes. It may be applied to any such process that seeks to minimize risk that may be calculated as a function of the standard deviations of each asset class and their covariances or correlations. The invention may most typically be applied to facilitate portfolio optimization under the widely-used paradigm derived from the work of Harry M. Markowitz (see for example "Portfolio Selection," *Journal of Finance* (March 1952), and Portfolio Selection: Efficient Diversification of Investments (New York: John Wiley & Sons, 1959) which publications, to the extent it is consistent with our invention, is hereby incorporated by reference), commonly referred to as mean-variance efficiency. In such an approach the risk function is a quadratic form. Of course this invention could also, quite naturally, be applied to extensions of the Markowitz approach, such as described by Michaud and Michaud (Michaud, Efficient Asset Management, A Practical Guide to Stock Portfolio Optimization and Asset Allocation, 1998, which publication, to the extent it is consistent with our invention, is hereby incorporated by reference). Alternatively, it could be applied to any form of risk function which is based on the aforementioned statistical characteristics and which may be solved by algorithms for calculating a minimum, subject to linear constraints. The essential purpose of the invention is to establish a means and process by which i) both pre-tax and after-tax portfolio restrictions may be transformed into a set of consistent linear after-tax constraints, ii) the pre-tax characteristics of asset classes under consideration for the investor's portfolio may be transformed into after-tax characteristics, and iii) the prescribed efficient portfolios may be presented to the investor in pre-tax form, usually as hypothetical portfolios along the efficient frontier. It is also an object of this invention to provide a method of creating a derived asset class from the tax parameters, expected returns, and standard deviations of more than one, predefined asset class.

Presently no commercially-available process exists to achieve the objectives of the invention, which are detailed as follows:

BRIEF DESCRIPTION OF THE FIGURES

FIG. 1 is the flow chart showing an inventive process for defining and creating asset classes.

FIG. 2 shows the inventive process for determining after-tax, total return and standard deviation for an asset class.

FIG. 3 shows the inventive process for developing an optimal after-tax investment strategy.

DETAILED DESCRIPTION OF THE PREFERRED EMBODIMENT

Creation of Derived Asset Classes

Commercially available computer programs that may be used to calculate an efficient frontier usually provide a standard set of potentially investable asset classes. They typically provide estimates of pre-tax expected total returns along with standard deviations and pair-wise correlations of such total returns for each of the several specified standard asset classes, or a means by which the user may specify how such expected returns, standard deviations, and pair-wise correlations may be determined (usually by analysis of an historical data base concerning the asset class). The user, however, may wish to use an asset class not included among the standard asset classes provided by such a program. In that case the user must separately determine and then enter into the program all of the necessary data for such a nonstandard asset class.

This invention allows a user to specify the linear coefficients and automatically calculate the necessary asset class data from a combination of data from the standard and previously specified asset classes. For example, a user may desire to explicitly set up real estate investment trusts as a separate asset class. Suppose such an asset class is not a standard asset class, whereas real estate, small-cap stocks, and corporate bonds are among the standard asset classes. The user may use the subject inventive program to create the real estate investment trust asset class by specifying, for example, that the return to the real estate investment trust asset class is to be derived from 50% of the return to real estate, 25% of the return to small-cap stocks and 25% of the return to corporate bonds. Estimates of necessary tax parameters, expected returns, standard deviations and correlations with other asset classes are thus derived from relationships for a linear combination of random variables which may be specified by the user. The preferred embodiment of the invention follows such a calculation methodology. As an example, the calculations for a combination of three variables are as shown in Equations 1, 2, and 3 on the section entitled "Calculation of Estimates for a Derived Asset Class" shown below. However, this invention anticipates permitting the user to change the standard deviation of a derived asset class arbitrarily by use of a specified standard deviation multiplier. For example, suppose an investor holds 40% of his portfolio in a single large-cap stock. In this situation, it may be appropriate to derive an asset class from the large-cap stock asset class to represent the single stock since the stock position is a significant part of the portfolio and therefore may merit special treatment. Now, suppose the single stock is 3 times as volatile as the large-cap stock asset class as a whole. Then, the expected pre-tax return for the single stock asset class would be estimated as the same as the return for the large-cap stock asset class, and the expected pre-tax standard deviation for the single stock asset class would be estimated as 3 times the standard deviation for the large-cap stock asset class.

The determination of the correlation between the returns to the single stock asset class and the returns to any other asset class is not readily apparent This invention specifies a simple methodology of dividing what would have otherwise been determined as the correlation between the derived asset class and any other asset class by the amount of the specified standard deviation multiplier.

Calculation of Estimates for a Derived Asset Class

I. Linear Combination of Asset Classes

As an example, consider the possible combination of three asset classes:

Assume W, X, Y and Z are random variables that represent the pre-tax total returns from four different asset classes with means (expected returns) $\bar{w}, \bar{x}, \bar{y}$ and $\bar{z}$ and standard deviations given by or, $\sigma_w, \sigma_x, \sigma_y, \sigma_z$ and covariances given by $\sigma_{wx}, \sigma_{wy}, \sigma_{wz}, \sigma_{xy}$, and $\sigma_{yz}$ and pair-wise correlations given by $\rho_{wx}, \rho_{wy}, \rho_{wz}, \rho_{xy}, \sigma_{xz}$ and $\rho_{yz}$.

Let $V=\alpha+\beta_1 X+\beta_2 Y+\beta_3 Z$ represent the return from a derived asset class created by a linear combination of three other asset classes, where $\alpha$ is an arbitrary constant and $\beta_1, \beta_2, \beta_3$ are linear coefficients.

Then,

1. $\bar{v}$ (expected return for the derived asset class)$=\alpha+\beta_1 \bar{x}+\beta_2 \bar{y}+\beta_3 \bar{z}$
2. $\sigma_v$(standard deviation for the derived asset class) $=[(\beta_1 \sigma_x)^2+(\beta_2 \sigma_y)^2+(\beta_3 \sigma_z)^2+(2\beta_1\beta_2\sigma_x\sigma_y\rho_{xy})+(2\beta_1\beta_3\sigma_x\sigma_z\rho_{xz})+(2\beta_2\beta_3\sigma_y\sigma_z\rho_{yz})]^{1/2}$
3. $\rho_{wv}$(correlation between W and V) $=[(\beta_1\sigma_x\rho_{wx})+(\beta_2\sigma_y\rho_{wy})+(\beta_3\sigma_z\rho_{wz})]/\sigma_v$ Note: Each of the factors which are necessary for the calculation of the after-tax total return (e.g. ordinary income, turnover, applicable tax rates, tax basis, etc.) is given by the same linear relationship where:

Combined factor$=\alpha+\beta_1$(factor for asset $X$)$+\beta_2$(factor for asset $Y$)$+\beta_3$(factor for asset $Z$)

The user is always provided the option to modify any formula result.

II. Standard Deviation Multiplier

A unique feature of the inventive process is the ability of the user to specify a multiplier for the derived asset class standard deviation and a method for determining the cross correlation between that derived asset class and any other asset classes. For example, let X and Z be new random variables that represent returns from two different asset classes with expected returns $\bar{x}$ and $\bar{z}$ and standard deviations $\sigma_x$ and $\sigma_z$. The covariance between X and Z is given by $\sigma_{xz}$. The correlation between X and Z is given by $\rho_{xz}$.

Suppose another new random variable $Y=X+\epsilon$ where $\epsilon$, an error term, is a random variable with expected value of zero and which is assumed to be unrelated to X and Z. Also, suppose that standard deviation of Y, $\sigma_y$, is a multiple of standard deviation of X, $\sigma_x$, i.e., $\sigma_y=k*\sigma_x$(k: standard deviation multiplier). Here, Y is a random variable representing the return from a derived asset class created as a by-product of any other asset class. X is the random variable representing the return of any other asset class and by itself may have been a derived asset class.

Then, 1. expected return for $Y=\bar{y}=\bar{x}$
2. standard deviation of $Y=\sigma_y=k*\sigma_x$ by specification
3. correlation between Y and Z is given by $\rho_{yz}=\rho_{xz}/k$ The foregoing methodologies are the preferred embodiment of this invention. However, any method of derivation may be used. Further, the user would have the flexibility to arbitrarily make changes to any of the calculated data, were the user to determine such were suitable to best represent the derived asset class.

The process of defining an asset class is depicted in FIG. 1. Each asset in the investor's current portfolio is associated with one of the standard asset classes (ovals 1 and 2). If not all of the assets (or potential assets that the investor desires to consider for future investment) can be so associated, additional asset classes may be created (boxes 3, 3A, 3B, etc.). The method of creation depends upon whether or not the asset class can be represented by a combination of one or more other asset classes (box 3B). If not, the user must provide all necessary data for the such nonstandard asset class (box 3A). If the asset class can be represented by a combination of one or more assest classes, then the user need only specify which classes to combine and in what proportions (boxes, 4, 4A, and 4B). The program would calculate the necessary derived asset class data automatically (box 5) using the inventive method detailed above. Finally the user may manually override any data so calculated (box 6).

III. Generalization

The foregoing calculations for a derived asset class may be generalized for more than three asset classes as set forth below.

DEFINITIONS:

| TERM | DEFINITION |
|---|---|
| $x_i, i = 1$ to n | Random variable that represent the return from the existing n asset class (standard and previously derived). The first n classes are those from which the user plans to derive the new n plus first asset class which return = $x^{n+1}$ |
| $\bar{\chi}_I$ | Expected return to asset class i. |
| $\sigma_{ij}$ | Covariance between $x_i$ and $x_j$. |
| $\sigma_i = \sqrt{\sigma_{ii}}$ | Standard deviation of $x_i$. |
| $\rho_{ij}$ | Correlation between $x_i$ and $x_j$. |
| $\epsilon$ | A random variable uncorrelated with any of the $x_i$ for $i = 1$ to n and with mean zero. |
| C | The standard deviation multiplier specified by the user. |
| $\beta t, i = 0$ to m | The constant term and linear coefficients specified by the user. |
| X | A vector with elements consisting of the $x_i$ for $i = 1$ to m. |
| $\bar{X}$ | A vector with the elements consisting of the $\bar{\chi}_i$, for $i = 1$ to m. |
| B | A vector with elements consisting of the $\beta t$ for $i = 1$ to m, and B' indicates the transpose of B. |
| $R_k$ | A vector of m elements, $\rho_{k,j}$ for $j = 1$ to m. |
| $\Sigma$ | An m by m matrix of variances and covariances with elements $\sigma_{ij}, i = 1$ to m and $j = 1$ to m. |
| S | A diagonal m by m matrix with diagonal elements $\sqrt{\sigma_{ij}}$ for $i = j, i = 1$ to m and $j = 1$ to m and all others elements set to zero. |

Specification:

The specifications for the derived asset class, n + 1 are as follows:

1. Return to the derived asset class:
$x_{n+1} = \beta_0 + B'X + \epsilon$
2. Expected return to the derived asset class:
$\bar{\chi}_{n+1} = \beta_0 + B'\bar{X}$
3. Standard deviation of the return to the derived asset class:
$\sigma_{n+1} = c\sqrt{B'\Sigma B}$
4. Correlation between the return of the derived asset class and the return on any other asset class
$\rho_{k,n+1} = (1/c\sigma_{n+1}))B'SR_k$ for $k = 1$ to n.

Investment Accounts

This invention provides that the user may establish any number of accounts. An account is simply a segregated grouping of a portion of the investment portfolio for which an efficient frontier is to be determined. Each account may incorporate an arbitrary set of asset classes but each asset class in that account must be subject to one of a number of sets of tax rules. Accounts are also useful because an investor may be restricted by legal or practical considerations from transferring funds between such accounts. For example, an investor may wish to adopt a portfolio strategy that includes his child's custodial assets in order to achieve a global family optimum portfolio. The child's assets may be segregated as a separate account. Additionally, the investor may have an interest in a deferred compensation program through his employer, which effectively allows no withdrawal of funds, but through which he may direct investments into a number of asset classes. The investors interest in this deferred compensation program may be segregated as a separate account. In practice, portfolios considered acceptable to the investor will be such that the aggregate market value of all of the asset classes in each account (except at least one fully-taxable account, as discussed below) will be subject to quantity restrictions. For example, the aggregate may not be allowed to change from its current value or it may not be allowed to exceed its current level.

Each account is assigned a specific type designation. Each type of account is then attributed with specified tax characteristics that apply to all the asset classes allowed in the account. The invention permits one to set up any number of different tax types. However, for simplicity the preferred embodiment of the invention specifies four types, of which one must apply to each account. The types are arbitrarily designated as: i) fully taxable, ii) tax deferred, iii) tax exempt, or iv) employee stock ownership plan (ESOP) sale proceeds account. Assets in a fully-taxable account are presumed to be taxable on a current basis consistent with the tax specifications assigned to the relevant asset classes. Tax-deferred accounts would typically be set up for 401k plans, regular IRAs, Keogh plans, deferred compensation plans, etc. Assets in a tax-deferred account are presumed to be fully taxable at a specified tax rate only when withdrawn from the account. A tax-exempt account would typically be represented by assets in a Roth IRA. Assets in a tax-exempt account are presumed not to be subject to income tax. Tax rules allow certain individual taxpayers to sell certain securities to an ESOP and to replace those securities with other qualified domestic securities without recognition of capital gain on the securities sold to the ESOP. Assets in an ESOP sale account represents those securities which may be sold to the ESOP and those which are eligible as qualified domestic securities.

Under the invention, the grouping and inputing of asset classes into an account causes the establishment of a linear constraint on those asset classes in the account—e.g. the sum of all market values of assets in the account must total to a number that equals the current value of all of the assets which the investor currently holds in the account. The specification of account type sets the tax characteristics of all the assets in the account. In effect, for optimization purposes, each asset class within an account is treated as if it were a separate and distinct asset class. As mentioned above, at least one fully taxable account must not be constrained to equal its initial value. This is because a tax may be due as a result of liquidation of assets required to effect a reallocation from the investor's current portfolio to a feasible efficient portfolio, which portfolio will have been specified with regard to after-tax considerations using our inventive method. Thus, allowance is made so that the tax may be paid from at least one account.

Calculation of After-tax Asset Class Characteristics

After-tax returns and after-tax standard deviations for each asset class are calculated from the corresponding pre-tax returns and pre-tax standard deviations based upon several specified factors. The preferred embodiment of the invention sets all after-tax correlations equal to pre-tax correlations, because such a relationship is dictated by probability theory under the assumption that the effective tax rate is a constant. This is consistent with current practice in the art. Other assumptions could be utilized and if so, another method of deriving after-tax correlations would be required. Any such method would fall within the scope of this invention.

After-tax Returns

The invention is unique in that its calculation of the after-tax expected return for an asset class explicitly accounts for the tax basis of the asset class and the investor's relevant tax time horizon. The tax time horizon is normally the number of time periods included in an investor's planning horizon. However, it may differ for certain asset classes. For example, a user may specify that a single asset constitutes an asset class. The investor may have an emotional attachment to such asset and/or it may be a very low tax basis asset that is a significant proportion of the value of the investor's current portfolio. The tax time horizon for that specific asset may be set to the a priori number of time periods that the investor would normally anticipate holding the asset class. Also, it could be set to the investor's life expectancy and earmarked for exclusion from capital gains taxes due to the statutory step-up in tax basis then allowed.

As with other commercially available methods, the preferred embodiment of the invention specifically incorporates asset class turnover, the portion of total asset class return that is appreciation, the portion that is realized income, and effective tax rates for both realized gain and income into calculated after-tax total returns. Although non-income-tax transaction costs are contemplated, as well, they are not included in the preferred embodiment, since they are deemed to be minor in comparison to income-tax effects. The preferred embodiment of the invention calculates and automatically assigns each asset class a set of two default tax rates (typically one for income, the other for realized gains) based upon the investor's general tax situation. Uniquely, however, the user may override assigned default rates and specify a different set of applicable tax rates to each asset class. In general terms the invention contemplates the possibility that any number of tax characteristics of total returns may be subject to tax, with each characteristic being subject to a separate effective tax rate and each asset class having some, all, or none of the effective tax rates in common.

The after-tax expected return is calculated by specifying a series of periodic expected after-tax cash flows. The discount rate which sets the present value of the sum of the expected after-tax cash flows equal to the current asset class value net of contingent tax (formula (7), discussed below), is the expected after-tax return for the asset class. FIG. 2 and the Formulas included herein and described in the formula sheets below illustrate the methodology under the preferred embodiment. Formulas (1) and (2) show one method of how the default tax rates may be determined from the investor's current federal and state marginal income tax rates on income and realized capital gains. Keep in mind that the default rates may be modified to any arbitrary rate as determined by the user. As a first step (circle 1, FIG. 2) the initial cost basis for each asset class to be considered must be set to its current tax basis, if represented in the investor's current portfolio, set to zero, or adjusted as shown in Formula (4A). Next, the periodic appreciation rate (box 2, FIG. 2) and the after-tax periodic income rate (box 3, FIG. 2) are determined from the specified pre-tax total expected return per period and the specified pre-tax income rate for the asset class in question. As indicated in box 4, FIG. 2, the initial value net of contingent tax is then determined. The contingent tax is the tax that the investor would be required to pay, if he were to liquidate all of his holdings currently in the asset class in question (Formula (4D)). Formula 4B illustrates the calculation of the Asset Appreciation Rate, and Formula 4C shows the calculation of the After-Tax Investment Income. At this point the process is to calculate the series of cash flows, net of tax, that the asset class is expected to provide. This is initiated by calculating the first period's cash flow, assumed to be derived from income, and subtracting out current taxes due for the period (FIG. 2, boxes 5 & 6). Such net cash flow would be discounted by the (unknown) after-tax return to obtain its current present value (Formula (4E)). Then the tax basis at the end of the period is updated to reflect the gains realized during the period (FIG. 2, box 7 and Formula (4F)). If the tax time horizon has not been reached (FIG. 2 box 8), then the net cash flow is calculated for the following period. The process continues in a loop as shown in sequence on FIG. 2 boxes 9, 10, 11, 12 and 13 with present values of cash flows determined according to Formula (4G) and end of period tax bases as shown in Formula (4H). When the tax time horizon is reached (FIG. 2, boxes 8 and 12) the final net expected after-tax value of the asset class is calculated (FIG. 2, box 14 and Formula (4I)). As illustrated in FIG. 2, box 15, the sum of all present values of the expected after-tax cash flows together with the discounted final asset value is then set equal to the initial net-of-contingent-tax value of the asset class. Finally, (FIG. 2, box 16) the equation may be solved for the unknown discount rate using well-known numerical methods. The expected after-tax rate of return for the asset class is then the value of the discount rate, so determined. Formula 4J shows the after-tax rate of total return. Note in the case of asset classes assigned to tax-deferred or tax-exempt accounts the forgoing process is not required as after-tax returns equal pre-tax returns (refer to Formula 4K).

After-tax Standard Deviations

In the preferred embodiment of the invention the calculation of after-tax standard deviations is a simpler process (FIG. 2, box 17 and oval 18). The after-tax standard deviation is simply the complement of the effective tax rate multiplied by the pre-tax standard deviation (Formula (5A)). This follows straight away from statistical theory if the effective tax rate is a constant, which is a typical assumption in the practice of the art. However, the invention allows for the case in which the relative volatility of income and appreciation components of the total pre-tax return may affect the effective tax rate. In this case the effective tax rate may first be approximated as shown in Formula (5B). The use of this formula requires an input item(referred to as Gamma in Formula (5B), and which may vary from 0 to 1) that specifies how stable the ordinary income component of the returns to the asset class may be. In the preferred embodiment the sensitivity factor is set to default to simple approximating assumptions. Thus, asset classes which are fixed income in nature and are of maturity longer than one year are generally assumed to have a Gamma of 1 whereas equity classes assumed to have a Gamma of 0. Users may, of course, override the default sensitivity factors. Other calculation methods of approximating after-tax standard deviations could be used in different embodiments of the invention.

Note Formula (5C), which indicates that in the case of asset classes assigned to tax-deferred or tax-exempt accounts the after-tax standard deviation of total returns is set equal to the pre-tax standard deviation of total returns.

Representation of Current Portfolio

An investment practitioner skilled in the state of the art typically represents an investor's current portfolio gross of tax, and this is the implied representation used in commercially available portfolio optimization programs. However, this is an incorrect procedure when compared to the portfolio guidance made possible by our invention. An investor can only spend or consume an asset on an after-tax basis. The unrealized income and gains that have accrued to an asset carry a liability to the taxing authorities due on liquidation. In effect, the taxing authorities are co-owners of the asset with the investor. Thus, the taxing authorities have a claim on the asset equal to the contingent tax due on the asset. The contingent tax is the difference between the market value of the asset and its tax basis multiplied by the expected effective tax rate upon liquidation (the contingent tax rate). The value effectively owned by the investor in any asset class is, then, the market value of the asset class less the contingent tax. This is designated the adjusted market value as shown in Formula (7). In the preferred embodiment of the invention the contingent tax rates are as given in Formula (6). Again, the user may arbitrarily change the contingent tax rate for any asset class. The total net value of the current portfolio (or total value of the portfolio, net of contingent tax) is simply the sum of the adjusted market value of each asset class in the portfolio (Formula (8A)). At this point FIG. 3, boxes 1-10, may be used to trace through the process described above. For example, boxes 1, 2, and 3 depict inputing data about the investor's portfolio and taax rast. Boxes 4 and 5 depict defining the asset classes, creating accounts, and entering market value and tax bases of asset holdings. Box 7 depicts specification of investment constraints. Boxes 8A, 8B, 8C and 9 catagorize assets and calculate after-tax returns and standard deviations. Box 10 depicts adjusting the values of constraint limits on asset classes.

Note that in the preferred embodiment of the invention, if an asset class is contained in the current portfolio with a tax basis other than that of the market value, another asset class is automatically derived from that asset class with identical pre-tax characteristics. The original asset class is given a default upper value limit equal to its current market value; this reflects the fact that, in general, an investor cannot purchase an asset that has a tax basis different than its purchase price.

Adjustment of Constraints

The next step in determining an optimal after-tax portfolio requires the adjustment of constraints imposed on the portfolio by the investor or the user. Typically one kind of constraint consists of lower and upper bound constraints on each asset class in each account in the investors portfolio. In effect such constraints state a minimum and a maximum investment that must be maintained in an asset class. The invention allows such a minimum or maximum to be specifically applied against either the gross market value or the adjusted market value of the asset class. In the preferred embodiment the convention adopted is that minimum or maximum constraint values which exceed one (i.e. given in dollar terms) are understood to be constraints on gross market value. Constraint specifications which are given as a value between zero and one (i.e. specified as a proportion of the portfolio) are understood to apply to the proportion that the adjusted asset class value bears to the total net value of the portfolio. The invention (FIG. 3, box 11) converts all gross market value limits to proportional limits. The adjustment procedures are specified in Formulas (8B) and (8C).

Another kind of constraint consists of a lower and upper bound for the value of a linear combination of asset classes. For instance, the user may specify that the value of the after-tax holdings of all equity investments is not to exceed a certain proportion of the total net value of the portfolio regardless of the account location of all such asset classes. As another example, the user may specify that all fixed income asset classed in fully taxable accounts must, in total, yield as specified dollar amount of income each period. The first step in adjusting such constraints is to calculate the gross-up ratio of before-tax market value to adjusted market value of each asset class (FIG. 3, box 12). The method for doing so is given in Formula (9A). The next step (FIG. 3, box 13) is to make any necessary adjustments to the constraints. The method follows the convention set forth in the prior paragraph concerning upper bounds and lower bounds, now as they apply to a linear combination of asset class values rather than to a single asset class. Constraints with bounds greater than one, that is those specified in dollar terms, must be adjusted. Adjustments for equality constraints are given in Formulas (9B). Inequality constraint adjustments are shown in Formulas (9C).

Efficient After-tax Frontier

At this point the invention has specified a method of setting up a complete set of constraints for use in a constrained minimization problem where the objective function is the risk function of the portfolio (FIG. 3, box 14). In the preferred embodiment the user is given the standard deviation of the portfolio's after-tax total return is the default risk function (mean-variance efficiency.) Each portfolio on the after-tax efficient frontier is determined by solving the constrained minimization problem given by all the aforementioned constraints plus the constraints that i) all the after-tax proportions that each individual asset class constitute of the total after-tax portfolio sum to unity and ii) the total after-tax return is a specified constant. In a well-known procedure, numerous portfolios on the after-tax efficient frontier are located by changing the constant specifying the total after-tax return. Several algorithms exist to solve the problem. They are available as optimization routines in certain commercial computer programs, most preferably a general mathematical analysis program such as MATLAB, a registered trademark of Mathworks, Inc., which can be programmed to interface with the method of the invention. Of course it is intended that all steps of manipulating the portfolio information would be performed on a general purpose electronic computer configured and programmed to perform as we have disclosed.

Conversion for Presentation and Implementation

The user is now in possession of the after-tax efficient frontier. For ease of presentation and implementation each optimal (efficient) after-tax portfolio is converted back to a pre-tax format which prescribes the pre-contingent-tax dollar amount that is to be placed in each asset class FIG. 3, box 15, Formula (10)). The user's last step is (FIG. 3, oval 16) to choose from among the identified portfolios provided by the invention that one which is most acceptable to the investor.

Mathematical Formulas Used for the Invention
(Formula Sheets)

I. Effective Ordinary Income Tax Rate ($TI$, may differ for each individual asset class, and may be investor-specific) =[Federal Marginal Tax Rate*(1−State Marginal Tax Rate)]+State Marginal Tax Rate    (1)

Note: The symbol, *, indicates the multiplication operator.

II. Effective Capital Gains Tax Rate ($TC$, applies to individual asset class, and may be investor-specific) =Federal Capital Gains Tax Rate+[State Marginal Tax Rate*(1−Federal Capital Gains Tax Rate)]    (2)

III. Account Classification Based on Distinct Tax Treatment

1) Fully Taxable—Brokerage Account, Bank Savings Account, and so on
2) Tax-Deferred—401k, Profit-sharing Plan, IRAs, Keoghs, and so on
3) Tax-Exempt—Roth IRAs
4) ESOP Sales—a collection of qualified domestic securities for reinvestment along with the security that may be sold to the ESOP.

IV. After-Tax Rate of Total Return (ATR, for individual asset class in Fully Taxable Accounts and ESOP Sales Accounts) =Internal Rate of Return Based on Stream of Discounted Cash Flows from Investment Over Time Horizon for Tax Consideration Inputs: Effective Ordinary Income Tax Rate, Effective Capital Gains Tax Rate, Average Annual Turnover Rate (TR), Before-Tax Rate of Total Return (PTR), Before-Tax Rate of Income Return (IR), Tax Basis (TB), Current Market Value NY), Time Horizon for Tax Consideration (N, specified in number of periods, typically years), Willingness to Liquidate Before Death [TPCODE, Yes (1) or No(0)] Note: By convention a tax basis entered as zero is taken to be market value.

Define:

COST(initial tax basis, for any asset class)=$TB$ (if $MV>0$, i.e., asset is currently held), or 0 (if $MV=0$, i.e., asset is not currently held)    (4A)

V. After-Tax Rate of Total Return

Define:

Asset Appreciation Rate(APR, for individual asset class) =$1+PTR-IR$    (4B)

After-Tax Investment Income(ATI, in percentage, for individual asset class) =$MV*IR*(1-TI)$    (4C)

Initial Asset Value(net of capital gain tax payment on unrealized gain) =$MV-TC*(MV-\text{COST(initial)})$    (4D)

Note: If the asset is not currently held (MV=0), then for the purposes of (4E) through (4J) only, MV and COST(initial) should be set equal to a single arbitrary positive number for fully taxable accounts. In the case of ESOP Sales Accounts, then again for the purposes of (4E) through (4J) only, MV should be set equal to an arbitrary positive number and COST (initial) should be set to a corresponding number such that the ratio of COST(initial) to market value is the same as the security that may be sold to the ESOP.

For Period(T)=1:

Discounted Cash Flow($F$)=$[ATI-TC*TR*(MV*APR-\text{COST(initial)})]/(1+ATR)$    (4E)

i.e. [Discounted Cash Flow=(After-Tax Investment Income−Tax Payment on Realized Capital Gain)/(1+Discount Rate)]

COST(updated)=COST(initial)*$(1-TR)+TR*MV*APR$    (4F)

Repeat for T=2 to N:

$$F = [ATI^*MV^*APR^{\wedge}(T-1) - TC^*TR^*(MV^*APR^{\wedge}(T) - COST(previous))]/(1+ATR)^{\wedge}(T) \quad (4G)$$

$$COST(updated) = COST(previous)^*(1-TR) + TR^*MV^*APR^{\wedge}T \quad (4H)$$

$$\begin{aligned}
&\text{Discounted Final Asset Value} = \\
&\quad [MV*APR\wedge(N) - TC*(MV*APR\wedge(N) - \\
&\quad\quad COST(\text{updated at } T=N))]/(1+ATR)\wedge(N) \\
&(\text{if } TPCODE = \text{Yes}) \text{ or} \\
&\quad [MV*APR\wedge(N)]/(1+ATR)\wedge(N) \; (\text{if}TPCODE = \text{No})
\end{aligned} \quad (4I)$$

To Calculate the After-Tax Rate of Total Return:

$$\begin{aligned}
&\text{Set Initial Asset Value} = (\text{Sum of Discounted Cash} \\
&\quad \text{Flows}, F, \text{ for } T=1 \text{ to } N) + \text{Discounted Final Asset} \\
&\quad \text{Value \& Solve for } ATR
\end{aligned} \quad (4J)$$

Note: for all asset classes in Tax-Deferred and Tax-Exempt Accounts $$ATR(\text{after-tax total return}) = PTR(\text{before-tax total return}) \quad (4K)$$

V. After-Tax Standard Deviation $$\begin{aligned}
&(ATSD, \text{ for individual asset classes in Fully Taxable} \\
&\quad \text{Accounts and ESOP Sales Accounts}) = (1-\text{Effec-} \\
&\quad \text{tive Tax Rate})^*\text{Before-Tax Standard Deviation}
\end{aligned} \quad (5A)$$

$$\begin{aligned}
&\text{where Effective Tax Rate} = \\
&\quad 1 - [(MATR - (1-TI)*\text{Gamma}*IR)/ \\
&\quad (PTR - \text{Gamma}*IR)] \text{ and Gamma} = \\
&\quad \text{Asset Class's Sensitivity} \\
&\quad \text{to Ordinary Income Tax(between 0 and 1)} \\
&\text{e.g.) fixed income asset classes}: 1, \text{ equity asset classes}: 0 \\
&\text{The modified after-tax return } (MATR) \text{ is the} \\
&\quad ATR \text{ calculated as if COST(initial) were equal to } MV.
\end{aligned} \quad (5B)$$

(Special Case) if PTR=IR, Effective Tax Rate=TI

Note: for all asset classes in Tax-Deferred & Tax-Exempt Accounts $$ATSD = \text{Before-Tax Standard Deviation} \quad (5C)$$

VI. Contingent Tax Rates $$\begin{aligned}
&(TEG, \text{ tax rates applied to} \\
&\quad \text{embedded capital gain}) \\
&= TC \text{ (for all asset classes in Fully Taxable accounts} \\
&\quad \text{and ESOP Sales Accounts) or} \\
&= TI \text{ (for all asset classes in Tax-Deferred accounts) or} \\
&= 0 \text{(for all asset classes in Tax-Exempt accounts)}
\end{aligned} \quad (6)$$

VII. Adjustment of Individual Asset Class's Current Market Value due to Contingent Tax Assume: Basis(TB) for all asset classes in Tax-Deferred & Tax-Exempt accounts=0

$$ADJMV(\text{adjusted } MV) = MV - TEG^*(MV - TB) \quad (7)$$

VIII. Adjustment of Constraint Limit(Lower and Upper) on Single Asset Class due to Contingent Tax Convention: All Values of Limits in Percentage (i.e. fractional values between 0 and 1) imply After-Tax Limits & No Adjustments are necessary All Values of Limits in Dollar (i.e. values equal to or greater than 1) imply Before-Tax Limits & need to be converted to After-Tax Percentage Limits Common Notation:

$$VLB <= X <= VUB,$$

where

VLB represents a value of lower limit for constraint on an asset class

X represents an location for an individual asset class

VUB represents a value of upper limit for constraint on an asset class $$\text{Compute, } ATPV(\text{total value of portfolio, net of contingent tax}) = \Sigma ADJMV(\text{sum of all adjusted } MV) \quad (8A)$$

$$\begin{aligned}
&\text{For asset classes in Fully Taxable Accounts and ESOP} \\
&\text{Sales Accounts:} \\
&\quad \text{If } VLB > 1 (\Rightarrow \text{dollar limit}) \\
&\quad ADJVLB(\text{adjusted } VLB) = (VLB*ADJMV/MV)/ATPV \\
&\text{(Special Case) If } ADJMV = 0 (\text{i.e., asset is not currently held}), \\
&\quad ADJVLB = VLB/ATPV \\
&\text{NOTE: FOR EACH ASSET CLASS IN THE ESOP} \\
&\quad \text{ACCOUNTS THE } ADJVLB \text{ AND} \\
&\quad MV \text{ VALUES USED IN THE FOREGOING} \\
&\quad \text{ARE THOSE OF THE SECURITY THAT} \\
&\quad \text{IS TO BE SOLD TO THE ESOP.} \\
&\text{For all asset classes in Tax-Deferred Accounts:} \\
&\quad \text{If } VLB > 1 (\Rightarrow \text{dollar limit}) \\
&\quad ADJVLB = [VLB*(1-TI)]/ATPV \\
&\text{For all asset classes in Tax-Exempt Accounts:} \\
&\quad \text{If } VLB > 1 (\Rightarrow \text{dollar limit}) \\
&\quad ADJVLB = VLB/ATPV
\end{aligned} \quad (8B)$$

Likewise, $$\begin{aligned}
&\text{For asset classes in Fully} \\
&\text{Taxable Accounts or ESOP Sales Accounts:} \\
&\quad \text{If } VUB > 1 (\Rightarrow \text{dollar limit}) ADJVUB(\text{adjusted } VUB) = \\
&\quad (VUB*ADJMV/MV)/ATPV \\
&\text{(Special Case) If } ADJMV = 0 (\text{i.e., asset is not currently held}), \\
&\quad ADJVUB = VUB/ATPV \\
&\text{NOTE: FOR EACH OF THE ASSET CLASSES IN THE ESOP} \\
&\quad \text{SALES ACCOUNTS THE ADJVUB AND MV VALUES} \\
&\quad \text{USED IN THE FOREGOING ARE THOSE OF THE} \\
&\quad \text{SECURTIY THAT IS TO BE SOLD TO THE ESOP.} \\
&\text{For all asset classes in Tax-Deferred Accounts:} \\
&\quad \text{If } VUB > 1 (\Rightarrow \text{dollar limit}) \\
&\quad ADJVUB = [VUB*(1-TI)]/ATPV \\
&\text{For all asset classes in Tax-Exempt Accounts:} \\
&\quad \text{If } VUB > 1 (\Rightarrow \text{dollar limit}) \\
&\quad ADJVUB = VUB/ATPV
\end{aligned} \quad (8C)$$

VIV. Adjustment of Linear Constraint Specification & Corresponding Limit (Lower and Upper) on Group of Asset Classes due to Contingent Tax Note: A linear constraint refers to investment restriction placed on combination of multiple asset classes across or within amounts Common Notation:

$BL <= B = \Sigma a_i * X_i <= BU$ for $i=1$ to $N$(number of individual asset classes), where B represents a linear constraint specification,
BL represents a value of lower limit on a linear constraint,
BU represents a value of upper limit on a linear constraint,
$X_i$ represents an allocation to each asset class, and
$\alpha_i$ represents a fixed portion of $X_i$ typically between 0 and 1, usually 0(0%) or 1(100%)

$$\text{Define: } GR(\text{gross-up ratio, applies to individual asset class}) \quad (9A)$$
$$= \text{Before-Contingent Tax } MV/\text{After-Contingent Tax } MV$$

For asset classes in Fully Taxable Accounts:
  If $ADJMV > 0$ (i.e., asset is current held),
    $GR = ADJMV/MV$
  If $ADJMV = 0$ (i.e., asset is not current held), $GR = 1$
For all asset classes in ESOP Sales Accounts,
    $GR = ADJMV/MV$ where
    the $ADJMV$ and $MV$ used is that of the security that
    is to be sold to the ESOP
For all asset classes in Tax-Deferred Accounts,
    $GR = 1/(1 - TI)$
For all asset classes in Tax-Exempt Accounts, $GR = 1$ For any equality linear constraint (9B)
If $BL = BU > 1 (\Rightarrow \text{dollar limit})$
  $ADJB$(adjusted linear constraint specification) =
  $B$(initial linear constraint specifications) *
  $GR$ or using a common notation =
  $\sum GR_i * a_i * X_i$ for $i =$
  1 to $N$(number of individual asset classes),
    where $GR_i$
  represents a value of gross-up ratio for each asset class
  $ADJBL$(adjusted $BL$) = $ADJBU$(adjusted $BU$)
    $= BL/ATPV = BU/ATPV$ -continued If $BL = BU < 1 (\Rightarrow \text{percentage limit})$ (9C)
  $ADJB = B$, $ADJBL = ADJBU = BL$(no adjustment necessary)
For any inequality linear constraint
  If $BL > 1 (\Rightarrow \text{dollar limit})$
    $ADJB = B * GR$ or using a common notation
    $= \sum GR_i * a_i * X_i$
    $ADJBL = BL/ATPV$
  If $BL < 1 (\Rightarrow \text{percentage limit})$
    $ADJB = B$, $ADJBL = BL$(no adjustments necessary)
    Likewise,
  If $BU > 1 (\Rightarrow \text{dollar limit})$
    $ADJB = B * GV$ or using a common notation
    $= \sum GR_i * a_i * X_i$
    $ADJBU = BU/ATPV$
  If $BU < 1 (\Rightarrow \text{percentage limit})$
    $ADJB = B$, $ADJBU = BU$(no adjustments necessary)

X. Converting Optimal, After-Tax Portfolio to Before-Tax Portfolio for Presentation & Implementation Suppose: OPTPORT=After-Tax, Percentage Allocation for Each Asset Class in an Optimal Portfolio calculated from Optimizer $PTOPPVAL_j$(before-tax allocation in dollar for each asset class)=$OPTPORT_j*ATPV*GR_j$ for $j=1$ to $M$(number of individual asset classes that make up the optimal portfolio) (10)

While the invention has been described in terms of a preferred embodiment, those skilled in the art will recognize that the invention can be practiced with modification and alteration within the spirit and scope of the appended claims.

We claim:

1. In a computerized method for financial planning, comprising:
   a. a computer;
   b. a computer program to optimize an investor's portfolio in order to maximize total return for any level of risk;
   c. assuming certain rates of return for various types of investments in the portfolio;
   d. defining several accounts within the portfolio, each of which accounts have assets, each of which asset in the account being characterized in one or more asset classes, the assets in a particular asset class having tax characteristics in common with one another and the assets in each asset class having a market value, a tax basis, an expected effective tax rate upon liquidation, investment characteristics, including after-tax expected returns and volatility estimates, and pre-tax investment constraints, which investment constraints have the effect of applying upper and lower limits to a financial value of the asset class that must be maintained;

e. determining the contingent tax on each asset class by calculating the difference between the market value of the asset class and its tax basis multiplied by the expected effective tax rate upon liquidation;

f. determining pre-tax and after-tax constraints on what asset classes are to be contained in the portfolio;

g. transforming the pre-tax constraints and pre-tax investment characteristics into a set of after-tax constraints and investment characteristics, including after-tax expected returns and volatility estimates;

h. adjusting market values of each asset class to reflect the effect of the contingent tax on the asset class; and i. selecting an optimized portfolio.

2. The method set forth in claim 1 wherein the step of transforming the pre-tax constraints and pre-tax investment characteristics into a set of after-tax constraints and investment characteristics farther includes, calculating after-tax returns and after-tax standard deviations for each asset class using corresponding pre-tax returns and pre-tax standard deviations.

3. A computerized method for optimizing an investor's portfolio in order to maximize total expected rate of return for a given level of risk, which method includes using an electronic computer configured by a computer program;

assuming certain expected total rates of return for various assets in the portfolio;

defining several accounts within the portfolio, each of which accounts have financial investments;

categorizing each asset in the portfolio as being in one or more asset classes and one or more accounts, the assets in a particular asset class and account having tax characteristics in common with one another, determining for each asset class in an account its market value, a tax basis, an effective tax rate upon liquidation, and other pre-tax and after-tax investment characteristics, including after-tax expected returns, and any pre-tax and after-tax investment constraints to which it may be subject, each of which investment constraints includes an upper limit and a lower limit on a linear combination of financial values of each asset class within each account;

determining the contingent tax on each asset class within each account by calculating the difference between the market value of the asset class within each account and its tax basis multiplied by its anticipated effective tax rate upon liquidation;

finding the after-tax market value of each asset class in each account by netting the asset class market value and its contingent tax;

transforming the pre-tax investment constraints and pre-tax investment characteristics into a set of after-tax constraints and investment characteristics, including after-tax expected returns and risk measures, and constructing an optimized portfolio by finding the after-tax market values for each asset class within each account consistent with all after-tax constraints that produce the highest expected after-tax rate of return to the portfolio for a given level of after-tax risk for the portfolio.

4. The method of claim 3 including converting the after-tax market values, after-tax returns, and after-tax constraints to their corresponding pre-tax market values, pre-tax rates of return and pre-tax constraints.

5. The method set forth in claim 3 wherein the step of transforming the pre-tax investment characteristics into a set of after-tax investment characteristics further includes calculating the after-tax standard deviations and after-tax pair-wise correlations of the after-tax rates of return for each asset class within each account using corresponding pre-tax rates of return, the pre-tax standard deviations and pre-tax pair-wise correlations of the pretax rates of return and the tax characteristics of each asset class within each account.

6. The method of claim 5 wherein calculating after-tax standard deviations includes consideration for differing volatilities that may apply to tax characteristics, such as ordinary income and capital gains to assets in the same asset class.

7. The method of claim 5 further including using the after-tax standard deviations and after-tax pair-wise correlations to calculate the level of after-tax risk of the investor's portfolio.

8. The method of claim 5 further including using the after-tax standard deviations that include consideration for differing volatilities that may apply to tax characteristics and after-tax pair-wise correlations to calculate the level of after-tax risk of the investor's portfolio.

* * * * *